No. 878,940. PATENTED FEB. 11, 1908.
R. W. CROCKER.
VESSEL CLOSURE.
APPLICATION FILED FEB. 11, 1907.
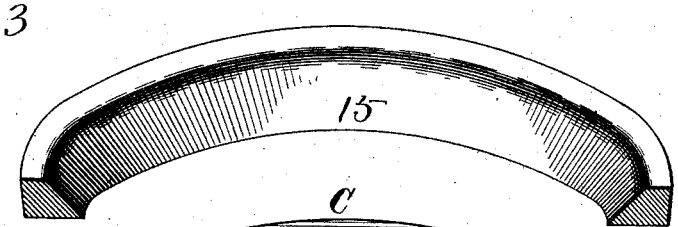
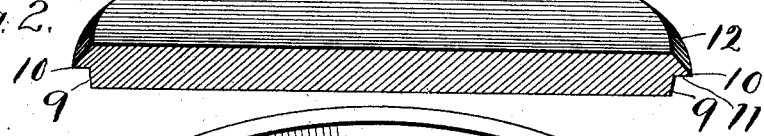
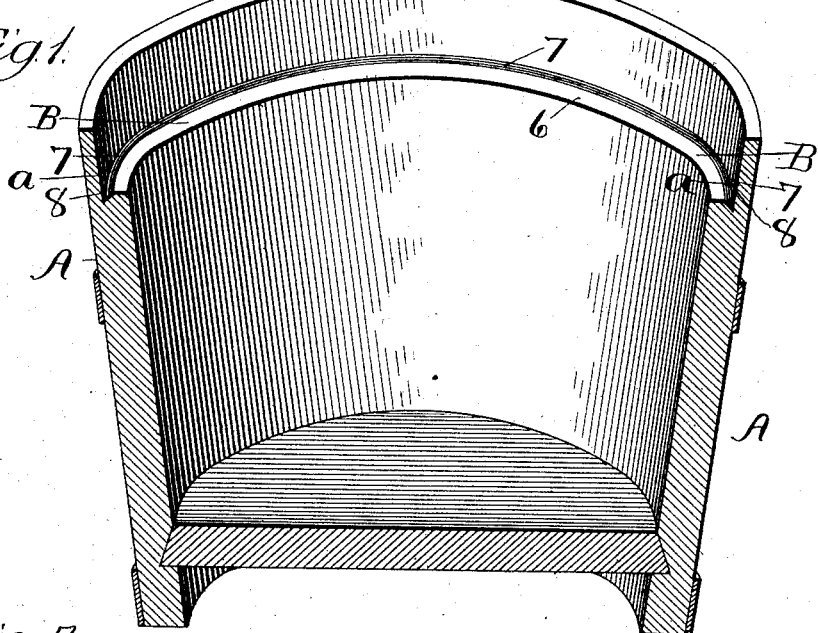
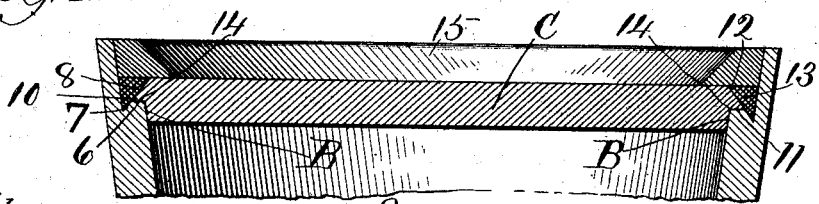

UNITED STATES PATENT OFFICE.

RALPH W. CROCKER, OF CHICAGO, ILLINOIS.

VESSEL-CLOSURE.

No. 878,940.　　Specification of Letters Patent.　　Patented Feb. 11, 1908.

Application filed February 11, 1907. Serial No. 356,800.

*To all whom it may concern:*

Be it known that I, RALPH W. CROCKER, citizen of the United States, residing at Chicago, in the county of Cook and State of Illinois, have invented certain new and useful Improvements in Vessel-Closures, of which the following is a specification.

This invention relates to a hermetically sealed closure for receptacles or packages made of any suitable material, but is more especially intended for use in connection with wooden pails and the like for the preservation and shipment of food products.

In the drawing, Figure 1 is a sectional elevation in perspective of a vessel embodying the improved features. Fig. 2 is a section of the cover. Fig. 3 is a section of a sealing joint ring; and Fig. 4 is a transverse section showing the joint parts in their assembled relation.

A represents a vessel or receptacle which may be of the form of a pail or kit and is preferably made of wood. This vessel is provided interiorly below the top with an annular shoulder B having the flat surface 6 and a beveled edge 7, forming an annular groove 8 between the beveled or sloping edge 7 and the surrounding wall a of the vessel.

The cover or cap C is of a less diameter than the vessel and is provided with an annular shoulder-part 9 which fits or telescopes down inside of the shoulder B, and forms a close fitting joint. This cover is also provided with a rim flange 10 the under flat side 11 of which comes to a bearing on the corresponding flat surface 6 of shoulder B as clearly shown in Figs. 1 and 4. The flange 10 is beveled as at 12 around its upper outer edge, the line of the bevel coming in line with the inner sloping surface of the shoulder B, so as to make the bevel or slope continuous from the top of the cover C to the bottom of the triangular or V-groove 7. In closing the joint this groove will ordinarily be filled with a soft or melted substance, such as paraffin or the like which will harden into a solid body 13 and form a seal that is impervious to both air and liquids.

It will be noted that the sealing substance extends both above and below the joining line 14 of the cover and shoulder B as shown in Fig. 4. This seal is completed and protected by a ring 15 which fits down inside of the top of the vessel and comes to a close bearing on the cover and the sealing substance as shown.

The ring 15 may be secured in place by any suitable fastening means that will securely retain the same in place and permit of its being readily removed when the vessel is to be opened to afford access to the contents. This forms a joint that will prevent the escape of any liquid contents and prevents the substance used as a seal from getting into the vessel and mixing with or injuring the contents.

Having thus described my invention, what I claim is—

1. A vessel having an internal annular horizontal shoulder adjacent its top, and an annular groove inclosing said shoulder and extending below the surface thereof, together with a cover adapted to seat on said shoulder but of insufficient diameter to cover said groove, there being thus provided between the edges of the cover and the walls of the vessel a space, which, with the groove, constitutes an annular recess adapted to receive sealing material and extending above and below the junction between cover and shoulder, and a retaining closure adapted to seat upon the top of the cover and to close the top of said recess.

2. A vessel having an internal annular horizontal shoulder adjacent its top, and an annular groove inclosing said shoulder and extending below the surface thereof, the inner wall of said groove being inclined, together with a cover adapted to seat on said shoulder but of insufficient diameter to cover said groove, the edges of said cover being beveled to form a continuation of the inclined wall of the groove, there being thus provided between the edges of the cover and the walls of the vessel a space, which, with the groove, constitutes an annular triangular recess adapted to receive sealing material and extending above and below the junction between cover and shoulder, and a retaining closure adapted to seat upon the top of the cover and to close the top of said recess.

3. A vessel having an internal annular horizontal shoulder adjacent its top, and an annular groove inclosing said shoulder and extending below the surface thereof, together with a cover having a rabbet in its under side forming a depending body portion adapted to fit within the walls of the vessel below the shoulder and a projecting flange rim adapted to seat on said shoulder but of insufficient diameter to cover said groove, there thus being provided between the edges of said rim and walls of the vessel a space, which, with the groove, constitutes an annular recess adapted to receive sealing material and extending above and below the junction between rim and shoulder, and a retaining closure adapted to seat upon the top of the cover and to close the top of said recess.

In testimony whereof I have signed my name to this specification in the presence of two subscribing witnesses.

RALPH W. CROCKER.

Witnesses:
L. B. COUPLAND,
G. E. CHURCH.